US012712271B2

(12) United States Patent
Moon et al.

(10) Patent No.: US 12,712,271 B2
(45) Date of Patent: Aug. 18, 2026

(54) HIGH GAIN PATCH ANTENNA AND METHOD OF MANUFACTURING THE SAME

(71) Applicant: ELECTRONICS AND TELECOMMUNICATIONS RESEARCH INSTITUTE, Daejeon (KR)

(72) Inventors: Seong Mo Moon, Daejeon (KR); Dong Hwan Shin, Daejeon (KR); Dong Pil Chang, Daejeon (KR); Han Lim Lee, Seoul (KR); Woo Hee Lim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 195 days.

(21) Appl. No.: 18/535,622

(22) Filed: Dec. 11, 2023

(65) Prior Publication Data

US 2024/0283156 A1 Aug. 22, 2024

(30) Foreign Application Priority Data

Feb. 16, 2023 (KR) ........................ 10-2023-0020871

(51) Int. Cl.
*H01Q 9/04* (2006.01)
*H01Q 1/48* (2006.01)
(Continued)

(52) U.S. Cl.
CPC ............. *H01Q 9/0421* (2013.01); *H01Q 1/48* (2013.01); *H01Q 9/46* (2013.01); *H01Q 21/0087* (2013.01); *H01Q 21/24* (2013.01)

(58) Field of Classification Search
CPC .......... H01Q 9/0421; H01Q 1/48; H01Q 9/46; H01Q 21/0087; H01Q 21/24; H01Q 21/065; H01Q 19/005; H01Q 1/38; H01Q 13/10
See application file for complete search history.

(56) References Cited

U.S. PATENT DOCUMENTS 5,668,558 A * 9/1997 Hong .................. H01Q 9/0435 343/846
6,063,479 A * 5/2000 Yoshikawa ............. H01J 11/44 428/323

(Continued)

FOREIGN PATENT DOCUMENTS

KR 20010044466 A 6/2001
KR 100656569 B1 12/2006

(Continued)

OTHER PUBLICATIONS

Xiao Zhang et al., "Gain-Enhanced Patch Antennas With Loading of Shorting Pins", IEEE Transactions on Atennas and Propagation, vol. 64, No. 8, Aug. 2016, pp. 3310-3318.

*Primary Examiner* — Dameon E Levi
*Assistant Examiner* — Jordan E. DeWitt
(74) *Attorney, Agent, or Firm* — Rabin & Berdo, P.C.

(57) ABSTRACT

A high gain patch antenna and a method of manufacturing the same are provided. The antenna includes a substrate with a flat structure including a dielectric, a cross-shaped conductor arranged at a center of an upper part of the substrate, and radiator units arranged in each of four areas divided by the cross-shaped conductor on the upper part of the substrate, wherein each of the radiator units may be arranged to have a 90-degree difference from an adjacent radiator unit with respect to a center of the substrate.

18 Claims, 10 Drawing Sheets

(51) Int. Cl.
*H01Q 9/46* (2006.01)
*H01Q 21/00* (2006.01)
*H01Q 21/24* (2006.01)

(56) References Cited

U.S. PATENT DOCUMENTS

| | | | | |
|---|---|---|---|---|
| 9,112,258 | B1 * | 8/2015 | Church | H01Q 7/005 |
| 2002/0021255 | A1 * | 2/2002 | Zhang | H01Q 13/10 343/770 |
| 2002/0149521 | A1 * | 10/2002 | Hendler | H01Q 1/36 343/895 |
| 2003/0122718 | A1 * | 7/2003 | Fang | H01Q 5/378 343/702 |
| 2003/0197647 | A1 * | 10/2003 | Waterman | H01Q 13/18 343/700 MS |
| 2003/0201941 | A1 * | 10/2003 | Aikawa | H01Q 21/064 343/770 |
| 2004/0004579 | A1 * | 1/2004 | Manzione | H01Q 5/40 343/893 |
| 2005/0057396 | A1 * | 3/2005 | Boyanov | H01Q 9/0407 343/700 MS |
| 2005/0264451 | A1 * | 12/2005 | Aikawa | H01Q 21/065 343/700 MS |
| 2007/0120739 | A1 * | 5/2007 | Johanessen | H01Q 23/00 342/388 |
| 2007/0199734 | A1 * | 8/2007 | Kudo | H05K 3/0052 29/25.35 |
| 2009/0128442 | A1 * | 5/2009 | Fujita | H01Q 5/385 343/907 |
| 2009/0140927 | A1 * | 6/2009 | Maeda | H01Q 9/045 343/700 MS |
| 2009/0322642 | A1 * | 12/2009 | Foo | H01Q 19/005 343/843 |
| 2016/0072196 | A1 * | 3/2016 | Boyer | H01Q 21/205 343/727 |
| 2016/0111770 | A1 * | 4/2016 | Choi | H01Q 1/523 343/893 |
| 2016/0171276 | A1 * | 6/2016 | Chiang | G06V 40/1329 382/124 |
| 2017/0237171 | A1 * | 8/2017 | Kim | H01Q 9/0407 343/850 |
| 2017/0331193 | A1 * | 11/2017 | Xue | H01Q 9/0428 |
| 2017/0352989 | A1 * | 12/2017 | Takahashi | H01R 13/6471 |
| 2018/0006369 | A1 * | 1/2018 | Higaki | H01Q 3/247 |
| 2018/0205151 | A1 * | 7/2018 | Celik | H01Q 5/40 |
| 2019/0036220 | A1 * | 1/2019 | Paulotto | H01Q 9/045 |
| 2019/0181557 | A1 * | 6/2019 | Isik | H01Q 21/062 |
| 2019/0312347 | A1 * | 10/2019 | Edwards | H01Q 9/0435 |
| 2020/0067183 | A1 * | 2/2020 | Chang | H01Q 21/24 |
| 2020/0136257 | A1 * | 4/2020 | Hwang | H01Q 1/3275 |
| 2020/0295436 | A1 * | 9/2020 | Ueda | H01Q 21/065 |
| 2020/0295437 | A1 * | 9/2020 | Ueda | H01Q 9/0407 |
| 2021/0151871 | A1 * | 5/2021 | Lyu | H01Q 1/521 |
| 2022/0166149 | A1 * | 5/2022 | So | H01Q 5/307 |
| 2023/0099552 | A1 * | 3/2023 | Kim | H01Q 1/48 375/267 |
| 2024/0047879 | A1 * | 2/2024 | Nozaki | H01Q 19/22 |
| 2024/0243460 | A1 * | 7/2024 | Schultz | H01Q 1/288 |
| 2024/0283156 | A1 * | 8/2024 | Moon | H01Q 9/0421 |
| 2025/0105510 | A1 * | 3/2025 | Zhang | H01Q 5/328 |
| 2025/0167461 | A1 * | 5/2025 | Ould-Mohamed | H01Q 9/045 |

FOREIGN PATENT DOCUMENTS

| | | | | |
|---|---|---|---|---|
| KR | 1020190091731 | A | 8/2019 | |
| KR | 102283081 | B1 * | 7/2021 | H01Q 1/48 |
| KR | 102354525 | B1 | 1/2022 | |
| KR | 1020220036601 | A | 3/2022 | |
| KR | 1020220074354 | A | 6/2022 | |

* cited by examiner

310

| Impedancce bandwidth | 17.1% (25.5GHz~30.3GHz) | |
|---|---|---|
| LHCP | Realized gain | 12.74 dBic |
| | SLL | -17.48 dB |
| RHCP | Φ=45° | 0.95 dBic |
| | Φ=0°, 90° | -8.19 dBic |
| In-band gain variation | 2.67 dB | |

330

| Impedancce bandwidth | 8.9% (27GHz~29.5GHz) | |
|---|---|---|
| LHCP | Realized gain | 12.8 dBic |
| | SLL | -24.6 dB |
| RHCP | Φ=45° | 2.69 dBic |
| | Φ=0°, 90° | - |
| In-band gain variation | 0.86 dB | |

410

| | | |
|---|---|---|
| Impedancce bandwidth | 10.71% (26.5GHz~29.5GHz) | |
| LHCP | Realized gain | 13.8 dBic |
| | SLL | -18.9 dB |
| RHCP | Φ=45° | -3.19 dBic |
| | Φ=0°, 90° | -3.63 dBic |
| In-band gain variation | 3.3 dB | |

430

| Impedancce bandwidth | 10.71% (26.5GHz~29.5GHz) | |
|---|---|---|
| LHCP | Realized gain | 14.4 dBic |
| | SLL | -18.33 dB |
| RHCP | Φ=45° | -2.21 dBic |
| | Φ=0°, 90° | -7.46 dBic |
| In-band gain variation | 3.35 dB | |

- Gain improvement
- Cross polarization improvement
- In-band gain variation improvement

450

| | | |
|---|---|---|
| Impedancce bandwidth | 9.64% (26.9GHz~29.6GHz) | |
| LHCP | Realized gain | 14.72 dBic |
| | SLL | -18.24 dB |
| RHCP | Φ=45° | -9.06 dBic |
| | Φ=0°, 90° | -2.76 dBic |
| In-band gain variation | 1.73 dB | |

610

620

| Array size | Realized gain (dBic) | | Side lobe level (dB) | HPBW (°) | Impedance bandwidth | Gain variation in impedance BW |
|---|---|---|---|---|---|---|
| | LHCP | RHCP | LHCP | LHCP | 27GHz~29GHz (7.14%) | 1.37dB |
| 4x4 | 19.45 | -0.98 | -15.98 | 17.56 | | |

HIGH GAIN PATCH ANTENNA AND METHOD OF MANUFACTURING THE SAME

CROSS-REFERENCE TO RELATED APPLICATION

This application claims the benefit of Korean Patent Application No. 10-2023-0020871 filed on Feb. 16, 2023, in the Korean Intellectual Property Office, the entire disclosure of which is incorporated herein by reference for all purposes.

BACKGROUND

1. Field of the Invention

One or more embodiments relate to a high gain patch antenna and a method of manufacturing the same, and more specifically, to a high gain planar circularly polarized (CP) antenna that may be effectively used in a millimeter wave band and a method of manufacturing the same.

2. Description of the Related Art

Due to the unique characteristics of electromagnetic waves, a millimeter wave band may have heavy losses depending on the radio wave path and severe signal attenuation due to moisture in the air. Accordingly, radio wave loss may occur in the millimeter wave band. In order to overcome the radio wave loss, using a high gain antenna may be essential. The high gain antenna with greater gain at the same size may be required to have the size, mass, and cost reduced.

A structure for a commonly used high gain antenna may have great height by forming an air gap between a ground and a radiator. Alternatively, the high gain antenna may be an antenna with large size, such as a horn antenna. Accordingly, when the antenna structure described above is configured as an array antenna using multiple antennas, physical limitations on volume may occur. In addition, since the millimeter wave band requires antennas and chips to be integrated and developed in module form, a structure for a small and planar antenna may be necessary.

SUMMARY

Embodiments provide a high gain antenna that may be used for satellite communication or in a millimeter wave band or higher.

Embodiments provide a high gain planar circularly polarized (CP) antenna that may be used for satellite communication or in a millimeter wave band or higher.

Embodiments provide a method of manufacturing a high gain antenna.

According to an aspect, there is provided an antenna, the antenna including a substrate with a flat structure including a dielectric, a cross-shaped conductor arranged at a center of an upper part of the substrate, and radiator units arranged in each of four areas divided by the cross-shaped conductor on the upper part of the substrate, wherein each of the radiator units may be arranged to have a 90-degree difference from an adjacent radiator unit with respect to a center of the substrate.

Each of the radiator units may include a main radiator including a feeding pin and a shorting pin, and a plurality of auxiliary radiators including shorting pins.

The plurality of auxiliary radiators may be arranged adjacent to the main radiator, and lengths of the plurality of auxiliary radiators may be shorter than a length of the main radiator.

The feeding pin of the main radiator may be arranged closer to the cross-shaped conductor than the shorting pin of the main radiator.

The antenna may further include a plurality of parasitic elements arranged on edges that are not in contact with the cross-shaped conductor, among the edges of the four areas, wherein the plurality of parasitic elements may be arranged symmetrically with respect to the cross-shaped conductor.

The cross-shaped conductor may include a plurality of shorting pins arranged at a distance that is greater than a distance from a center of the cross-shaped conductor to the radiator units.

The antenna may further include an antenna ground arranged on a lower part of the substrate, wherein the plurality of shorting pins of the cross-shaped conductor, the shorting pin of the main radiator, and the shorting pins of the auxiliary radiators may be connected to the antenna ground.

The antenna ground may include a cross-shaped slot arranged at a position corresponding to the center of the upper part of the substrate at which the cross-shaped conductor is arranged, wherein a size of the cross-shaped slot may be smaller than a size of the cross conductor.

The antenna may further include a feed network and/or a radio-frequency (RF) circuit arranged on a lowest layer of the antenna, wherein the feeding pin of the main radiator may be connected to the feed network and/or the RF circuit.

According to another aspect, there is provided an antenna, the antenna including a substrate with a flat structure including a dielectric, a cross-shaped conductor arranged at a center of an upper part of the substrate, radiator units arranged in each of four areas divided by the cross-shaped conductor on the upper part of the substrate, and an antenna ground including a cross-shaped slot arranged on a lower part of the substrate, wherein each of the radiator units may be arranged to have a 90-degree difference from an adjacent radiator unit with respect to a center of the substrate.

Each of the radiator units may include a main radiator including a feeding pin and a shorting pin, and a plurality of auxiliary radiators including shorting pins.

The plurality of auxiliary radiators may be arranged adjacent to the main radiator, and lengths of the plurality of auxiliary radiators may be shorter than a length of the main radiator.

The feeding pin of the main radiator may be arranged closer to the cross-shaped conductor than the shorting pin of the main radiator.

The antenna may further include a plurality of parasitic elements arranged on edges that are not in contact with the cross-shaped conductor, among the edges of the four areas, wherein the plurality of parasitic elements may be arranged symmetrically with respect to the cross-shaped conductor.

The cross-shaped conductor may include a plurality of shorting pins arranged at a distance that is greater than a distance from a center of the cross-shaped conductor to the radiator units.

The plurality of shorting pins of the cross-shaped conductor, the shorting pin of the main radiator, and the shorting pins of the auxiliary radiators may be connected to the antenna ground.

The cross-shaped slot may be arranged at a position corresponding to the center of the upper part of the substrate at which the cross-shaped conductor is arranged, wherein a size of the cross-shaped slot may be smaller than a size of the cross conductor.

The antenna may further include a feed network and/or an RF circuit arranged on a lowest layer of the antenna, wherein the feeding pin of the main radiator may be connected to the feed network and/or the RF circuit.

According to another aspect, there is provided a method of manufacturing an antenna, the method including arranging a substrate with a flat structure including a dielectric on an upper part of an antenna ground and arranging a cross-shaped conductor and radiator units on an upper part of the substrate, wherein the cross-shaped conductor may be arranged at a center of the upper part of the substrate, wherein the radiator units may be arranged in each of four areas divided by the cross-shaped conductor on the upper part of the substrate, and wherein each of the radiator units may be arranged to have a 90-degree difference from an adjacent radiator unit with respect to a center of the substrate.

The method may further include forming shorting pins and/or feeding pins for the radiator units and the cross-shaped conductor, wherein a main radiator included in the radiator units may include a shorting pin and a feeding pin, and wherein an auxiliary radiator and the cross-shaped conductor included in the radiator units may include shorting pins.

Additional aspects of embodiments will be set forth in part in the description which follows and, in part, will be apparent from the description, or may be learned by practice of the disclosure.

According to embodiments, satellite communication or communication in a millimeter wave band or higher may be performed using a high gain antenna.

According to embodiments, communication in a millimeter wave band or higher may be performed using a high gain planar CP antenna.

According to embodiments, a high gain antenna may be manufactured.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
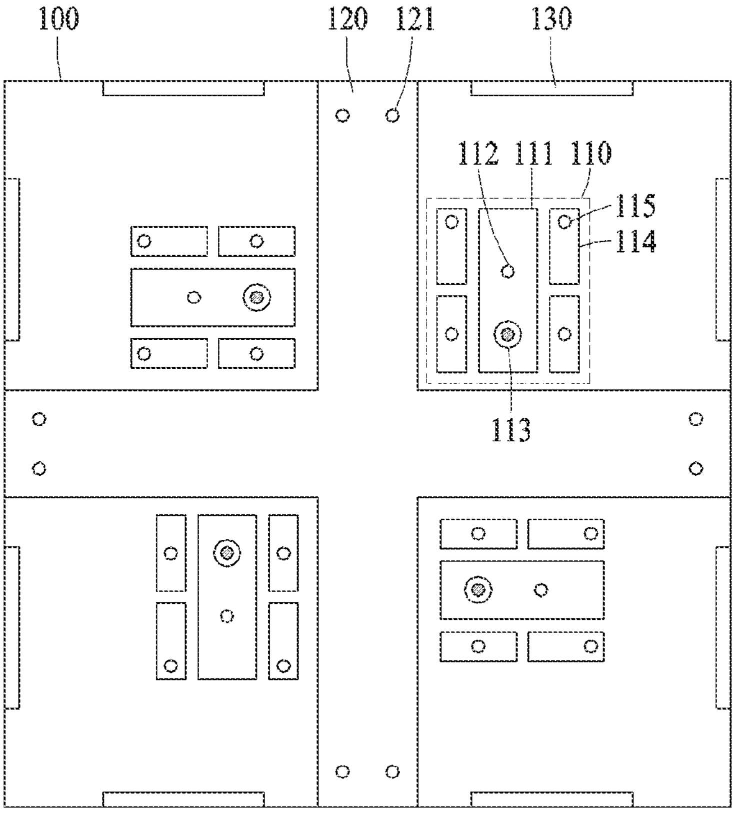
FIG. 1 is a diagram illustrating an antenna according to an embodiment.

Hereinafter, embodiments will be described in detail with reference to the accompanying drawings. However, the embodiments are not meant to be limited by the descriptions of the present disclosure. In the drawings, like reference numerals are used for like elements.

Various modifications may be made to the embodiments. Here, the embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

The terminology used herein is for the purpose of describing particular embodiments only and is not to be limiting of the embodiments. The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

In addition, when describing the embodiments with reference to the accompanying drawings, like reference numerals refer to like components and a repeated description related thereto will be omitted. In the description of embodiments, detailed description of well-known related structures or functions will be omitted when it is deemed that such description will cause ambiguous interpretation of the present disclosure.

Hereinafter, embodiments will be described in detail with reference to the accompanying drawings.

FIG. 1 is a diagram illustrating an antenna according to an embodiment.

Referring to FIG. 1, an antenna 100 is shown. The antenna 100 may be a circularly polarized (CP) antenna for generating circular polarization. The antenna 100 may be a planar patch antenna.

The antenna 100 may include a plurality of radiator units, a cross-shaped conductor 120, and a plurality of parasitic elements. The plurality of radiator units, the cross-shaped conductor 120, and the plurality of parasitic elements may be arranged on a substrate with a flat structure including a dielectric.

The plurality of radiator units may be arranged to have 90-degree difference with respect to the center of the substrate with a flat structure. The circular polarization may occur when signals with a 90-degree phase difference are applied for each predetermined delay to the plurality of radiator units arranged to have 90-degree difference.

It is clear that one of ordinary skill in the art may understand that the description of a radiator unit 110, which is one of the plurality of radiator units, also applies to other radiator units. Therefore, hereinafter, the radiator unit 110, which is one of the plurality of radiator units, is described.

The radiator unit 110 may include a main radiator 111 and an auxiliary radiator 114. The auxiliary radiator 114 may be arranged adjacent to the main radiator 111. The number of auxiliary radiators 114 may be greater than the number of main radiators 111. The length of the auxiliary radiator 114 may be shorter than the length of the main radiator 111.

The main radiator 111 may include a feeding pin 113 and a shorting pin 112. The feeding pin 113 may be connected to a feed network and/or a radio-frequency (RF) circuit that may be arranged on the lowest layer of the antenna 100. The shorting pin 112 may be connected to an antenna ground (not shown) arranged on a lower part of the substrate with a flat structure.

The auxiliary radiator 114 may include a shorting pin 115. The shorting pin 115 may be connected to an antenna ground (not shown) arranged on the lower part of the substrate with a flat structure.

The cross-shaped conductor 120 may be arranged at the center of an upper part of the substrate. The cross-shaped conductor 120 may divide the substrate into four areas. The plurality of radiator units described above may be arranged to have 90-degree difference in each of the four areas divided by the cross-shaped conductor 120. The cross-shaped conductor 120 may additionally generate coupling when the circular polarization occurs in the plurality of radiator units. That is, the directivity of the antenna 100 may be improved by arranging the cross-shaped conductor 120 in the center of the substrate.

The cross-shaped conductor 120 may include a shorting pin 121. The shorting pin 121 may be formed to be arranged at a distance that is greater than a distance from the center of the substrate to the plurality of radiator units in order to minimize the effect on circular polarization.

The gain of the antenna 100 may be additionally increased by arranging a parasitic element 130 on an edge that is not in contact with the cross-shaped conductor 120 among the edges of the four areas.

Hereinafter, the gain of the radiator unit 110 is described.

Figure 2:
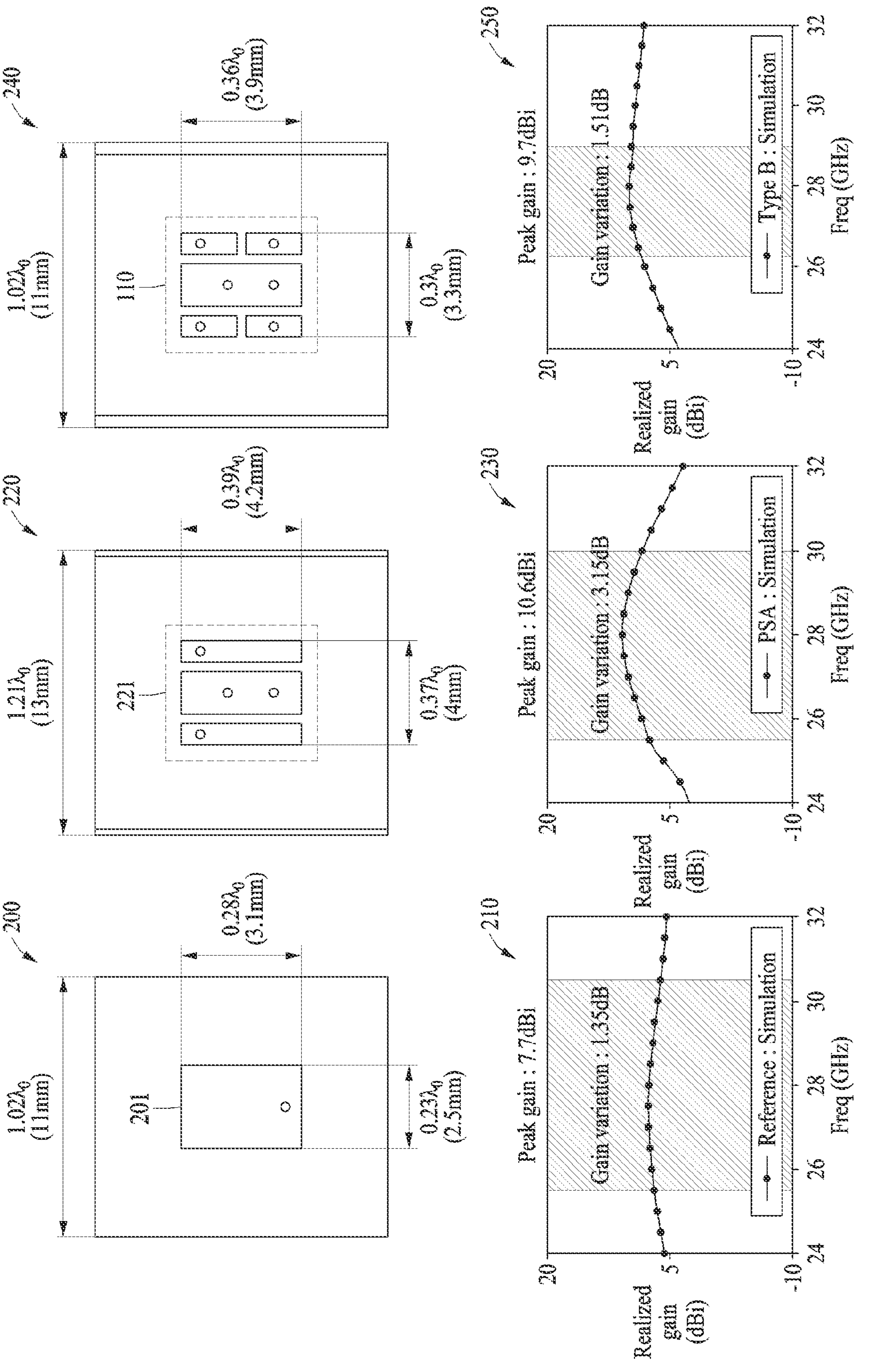
FIG. 2 is a diagram illustrating a radiator unit.

FIG. 2 is a diagram illustrating a radiator unit.

Referring to FIG. 2, an antenna including different radiator units is shown.

Referring to FIG. 2, antennas including only a single radiator unit are shown.

An antenna 200 may include a radiator unit 201 including one main radiator. An antenna 220 may include a radiator unit 221 including a main radiator and two auxiliary radiators with the same length as the main radiator. An antenna 240 may include the radiator unit 110 including a main radiator and four auxiliary radiators with lengths different from the main radiator.

A graph 210 is a graph showing gain variation within a peak gain and bandwidth of the antenna 200. Referring to the graph 210, the peak gain of the antenna 200 may be 7.7 decibel isotropic (dBi). The bandwidth of the antenna 200 may be approximately from 25.5 gigahertz (GHz) to 30.5 GHz. The gain variation of the antenna 200 in the corresponding bandwidth may be 1.35 decibel (dB).

A graph 230 is a graph showing gain variation within a peak gain and bandwidth of the antenna 220. Referring to the graph 230, the peak gain of the antenna 220 may be 10.6 dBi. The bandwidth of the antenna 220 may be approximately from 25.6 GHz to 30 GHz. The gain variation of the antenna 220 in the corresponding bandwidth may be 3.15 dB. That is, the antenna 220 may be a higher gain antenna than the antenna 200. However, the antenna 220 may have a narrower bandwidth and greater gain variation than the antenna 200.

A graph 250 is a graph showing gain variation within a peak gain and bandwidth of the antenna 240. Referring to the graph 250, the peak gain of the antenna 240 may be 9.7 dBi. The bandwidth of the antenna 240 may be approximately from 26.2 GHz to 29 GHz. The gain variation of the antenna 240 in the corresponding bandwidth may be 1.51 dB. That is, the antenna 240 may be a higher gain antenna than the antenna 200. The antenna 240 may have a lower peak gain than the antenna 220. However, the antenna 240 may be more stable, since the gain variation within the bandwidth is smaller than the gain variation of the antenna 220.

In other words, an antenna with high gain and small gain variation within the bandwidth may be obtained using the radiator unit 110 including auxiliary radiators with lengths shorter than the main radiator.

Hereinafter, an existing CP antenna for generating a circular polarized wave is described.

Figure 3:
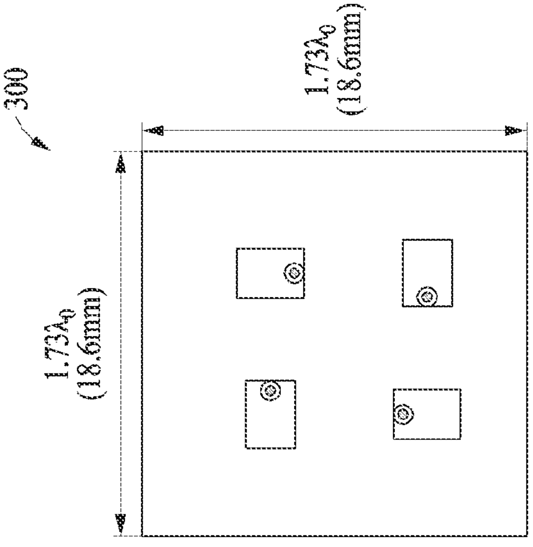
FIG. 3 is a diagram illustrating an existing antenna.
Figure 3:
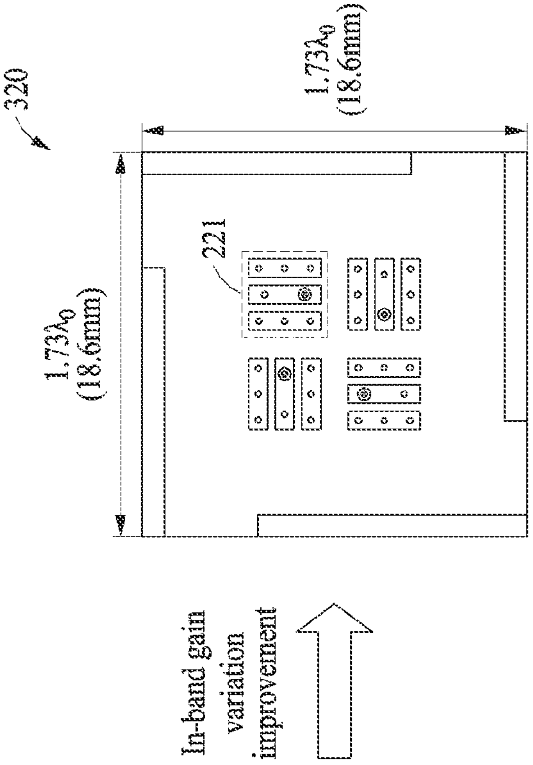

FIG. 3 is a diagram illustrating an existing antenna.

Referring to FIG. 3, an antenna 300 is shown in which the radiator units are arranged in a circular polarization form to have 90-degree difference with respect to the center of a substrate. Referring to FIG. 3, an antenna 320 is shown in which the radiator units 221 are arranged in the circular polarization form to have 90-degree difference with respect to the center of a substrate.

A table 310 may indicate performance of the antenna 300. A table 330 may indicate performance of the antenna 320.

The antenna 300 and the antenna 320 are assumed to be antennas designed to generate left-handed circular polarization (LHCP). Accordingly, right-handed circular polarization (RHCP) may be an undesired component and may be a type of noise. Therefore, lower RHCP gain may be better. A side lobe level (SLL) may be the intensity of side lobe pattern rather than main lobe pattern and may be a type of noise. Therefore, lower SLL may be better.

Referring to the table 330, when gain variation is reduced within a bandwidth of the antenna 320, the size of the gain is confirmed to be reduced to the level of the antenna 310. That is, as confirmed in FIG. 2, even though the antenna 320 is designed using the radiator unit 221 with a greater peak gain, the size of the gain may be 12.8 decibel isotropic circular (dBic), and when the antenna 300 is designed using the radiator unit 201 with a smaller peak gain, the size of the gain may be 12.74 dBic, so that the difference may not be great.

Hereinafter, performance of an antenna in which a cross-shaped conductor is arranged is described.

Figure 4A:
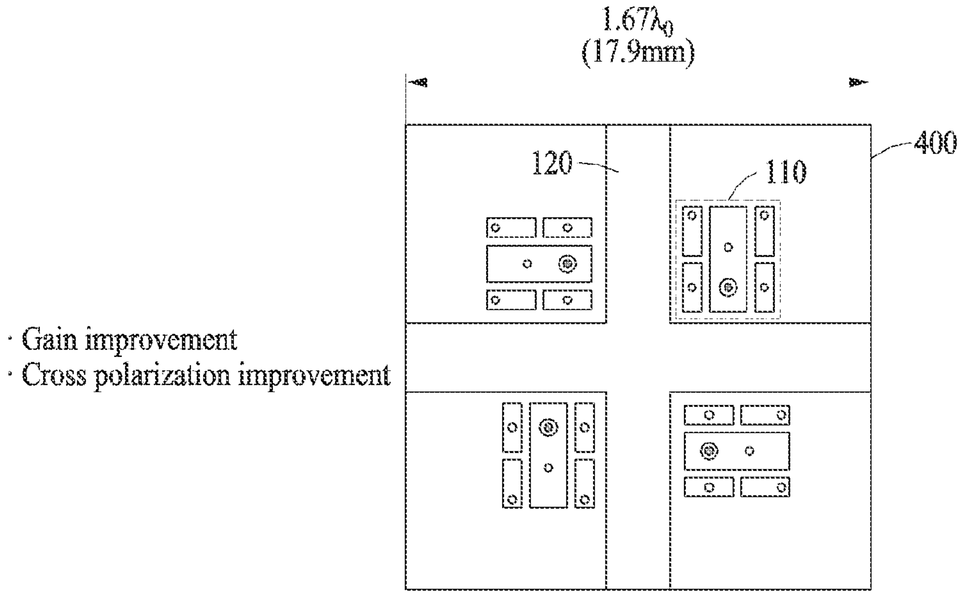
FIGS. 4A to 4C are diagrams illustrating an antenna according to an embodiment.
Figure 4B:
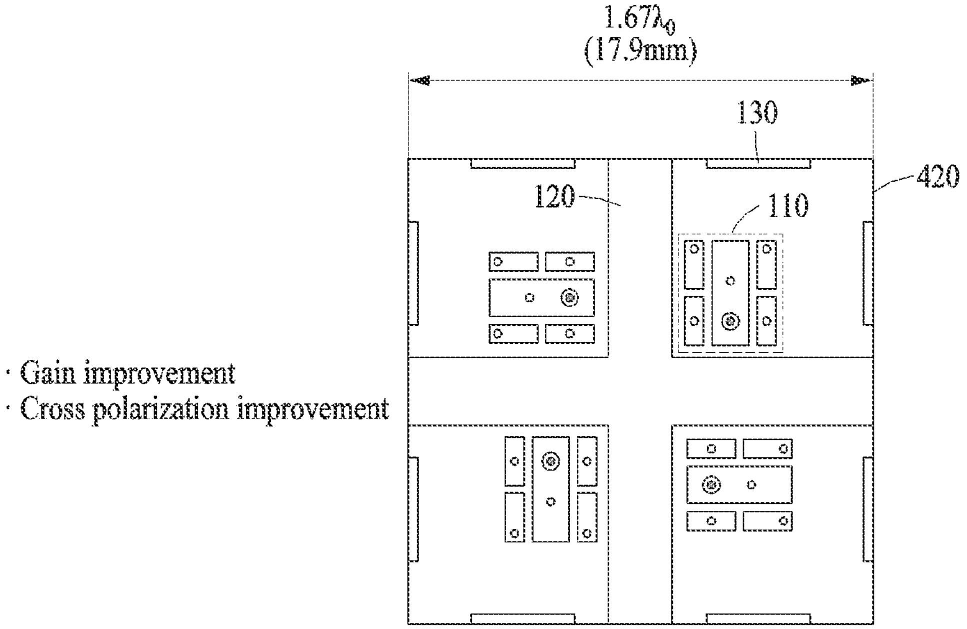
Figure 4C:
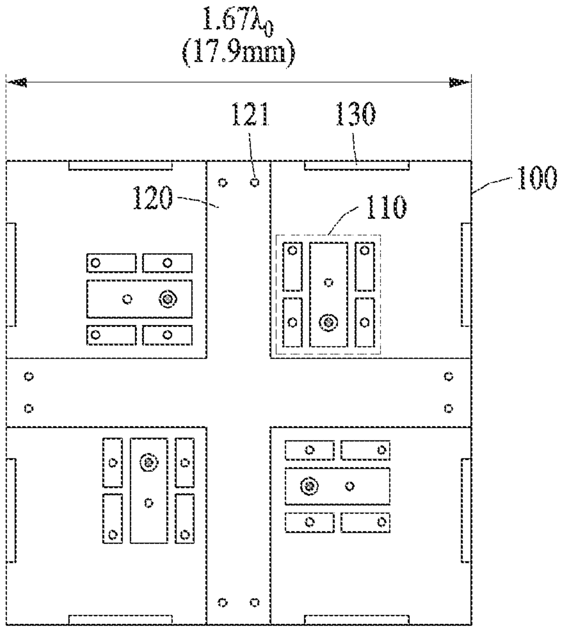

FIGS. 4A to 4C are diagrams illustrating an antenna according to an embodiment.

Hereinafter, an antenna 400, an antenna 420, and an antenna 430 are assumed to be antennas designed to generate LHCP. Accordingly, RHCP may be an undesired component and may be a type of noise. An SLL may be a type of noise.

Referring to FIG. 4A, an antenna 400 is shown in which the radiator units 110 are arranged in a circular polarization form to have 90-degree difference in four areas divided by the cross-shaped conductor 120.

A table 410 may be a table showing performance of the antenna 400.

Referring to the table 410, the size of the gain of the antenna 400 may be 13.8 dBic, which is greater than the sizes of the gains of the antennas 310 and 320 shown in FIG.

3. The SLL and RHCP gains of the antenna 400 may be smaller than the SLL and RHCP gains of the antennas 310 and 320 shown in FIG. 3.

Cross polarization, which is the difference between the desired polarization component and the undesired polarization component, that is, the difference between the LHCP gain and the RHCP gain, may be greater for the antenna 400 than for the antennas 300 and 320 shown in FIG. 3. In other words, the cross polarization may be improved.

When the cross-shaped conductor 120 is arranged at the center of the antenna 400 and circular polarization occurs, additional coupling may occur, thereby improving the directivity of the antenna 400. Therefore, the gain may be increased.

Referring to FIG. 4B, the antenna 420 is shown in which the radiator units 110 are arranged in the circular polarization form to have 90-degree difference in the four areas divided by the cross-shaped conductor 120 and the parasitic elements 130 are arranged.

A table 430 may be a table showing performance of the antenna 420.

Referring to the table 430, the size of the gain of the antenna 420 may be 14.4 dBic, which is greater than the size of the gain of the antenna 400 shown in FIG. 4A. The directivity of the antenna 420 may be further improved by the parasitic element 130, and thus, the gain may be improved.

Referring to FIG. 4C, the antenna 100 is shown that includes the cross-shaped conductor 120 formed by the shorting pins 121, the radiator units 110 arranged to have 90-degree difference in the four areas divided by the cross-shaped conductor 120, and the parasitic elements 130.

A table 450 may be a table showing performance of the antenna 100.

Referring to the table 450, when the shorting pins 121 are formed in the cross-shaped conductor 120, it may be noted that the gain of the antenna 100 may be 14.72 dBic, which is higher than the gains of the antennas 400 and 420. In addition, when the shorting pins 121 are formed in the cross-shaped conductor 120, it may be noted that variation in a bandwidth of the antenna 100 may be 1.73 dB, which is lower than variations of the antennas 400 and 420.

As a result, the antenna 100 may have, compared to the antenna 300 of FIG. 3, a gain improved by about 2 dBic, improved cross polarization characteristics, and the gain variation within the bandwidth improved by about 1 dB.

Hereinafter, a structure of the antenna 100 is described.

Figure 5:
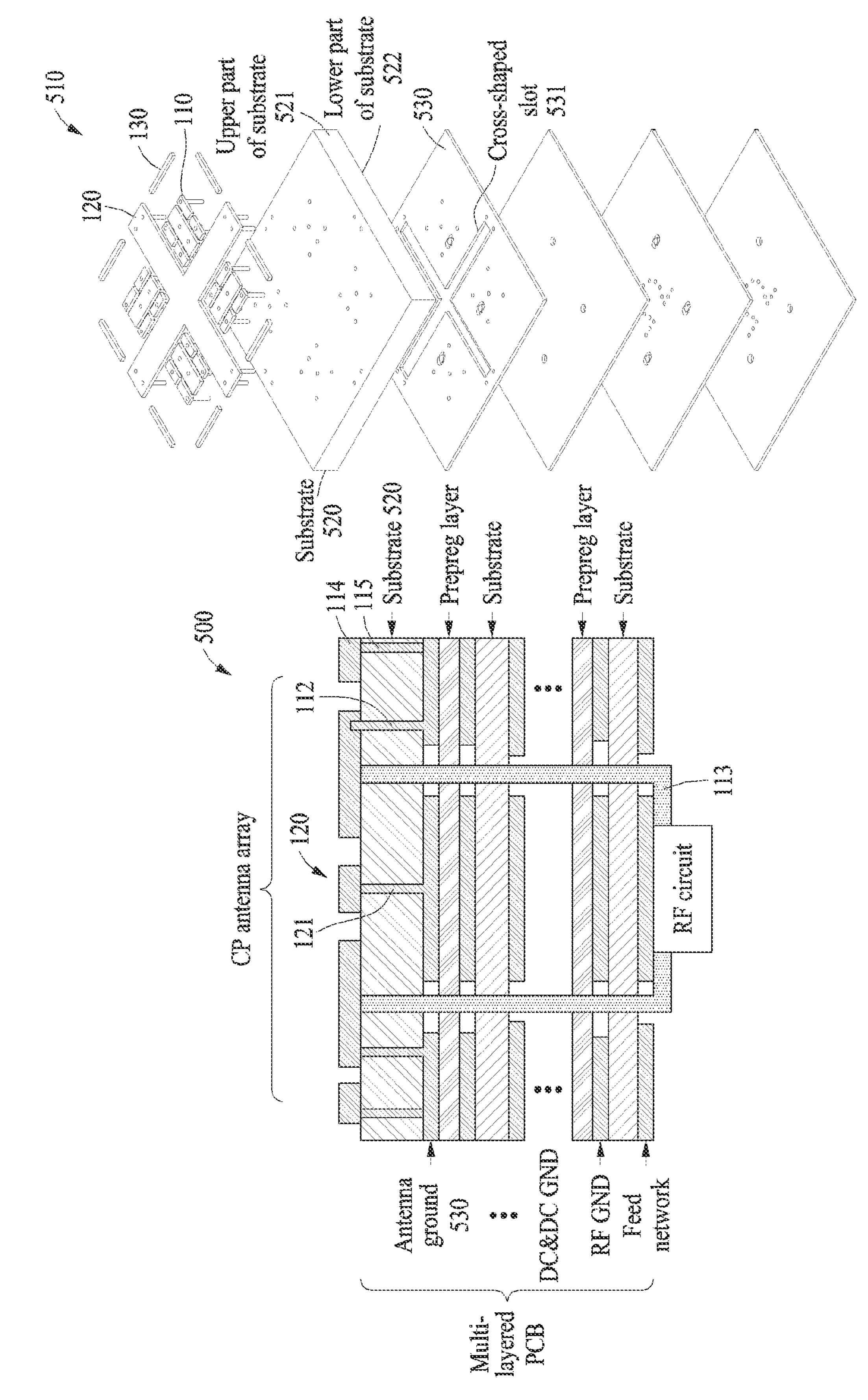
FIG. 5 is a diagram illustrating a cross-sectional view and an exploded view of an antenna according to an embodiment.

FIG. 5 is a diagram illustrating a cross-sectional view and an exploded view of an antenna according to an embodiment.

Referring to FIG. 5, a cross-sectional view 500 and an exploded view 510 of the antenna 100 are shown.

Referring to the cross-sectional view 500, an antenna ground 530 may be arranged on a lower part of a substrate 520. The cross-shaped conductor 120 and the radiator unit 110 may be shown on an upper part of the substrate 520. The radiator unit 110 may include the main radiator 111 and the auxiliary radiator 114. The main radiator 111 may include the feeding pin 113 and the shorting pin 112. The auxiliary radiator 114 may include the shorting pin 115. The cross-shaped conductor 120 may include the shorting pin 121.

The antenna ground 530 may be connected to the shorting pins. The antenna ground 530 may be connected to the shorting pin 112 of the main radiator 111. The antenna ground 530 may be connected to the shorting pin 115 of the auxiliary radiator 114. The antenna ground 530 may be connected to the shorting pin 121 of the cross-shaped conductor 120.

A multi-layer structure in which a prepreg layer, a direct current (DC) & DC ground, a substrate, and/or an RF ground are repeated may be formed on a lower part of the antenna ground 530. A feed network and/or an RF circuit may be arranged on the lowest layer of the antenna 100. The feeding pin 113 of the main radiator 111 may be connected to the feed network and/or the RF circuit.

Referring to the exploded view 510, the cross-shaped conductor 120 may be arranged at the center of an upper part 521 of the substrate 520. The radiator unit 110 may be arranged in four areas divided by the cross-shaped conductor 120. Among the edges of the four areas, the parasitic element 130 may be arranged on an edge that is not in contact with the cross-shaped conductor 120.

The antenna ground 530 may be arranged on a lower part 522 of the substrate 520. The antenna ground 530 may be connected to the shorting pins included in the cross-shaped conductor 120 arranged on the upper part 521 of the substrate 520 and the shorting pins included in the radiator unit 110. Accordingly, the substrate 520 may include holes for the shorting pins to pass through.

The antenna ground 530 may include a cross-shaped slot 531. The cross-shaped slot 531 may be arranged in a position corresponding to the center of the upper part 521 of the substrate 520 in which the cross-shaped conductor 120 is arranged in the antenna ground 530.

The size of the cross-shaped slot 531 may be smaller than the size of the cross-shaped conductor 120. Accordingly, the shorting pin 121 of the cross-shaped conductor 120 may be connected to the antenna ground 530. The gain of the antenna 100 may be improved by arranging the cross-shaped slot 531 on the antenna ground 530. Similar to the substrate 520, the antenna ground 530 may also include holes for the feeding pins to pass through.

The multi-layer structure in which the prepreg layer, the DC & DC ground, the substrate, and/or the RF ground are repeated may be formed on the lower part of the antenna ground 530. The feed network and/or the RF circuit may be arranged on the lowest layer of the multi-layer structure.

Hereinafter, a structure in which the high gain antenna described above is expanded is described.

Figure 6A:
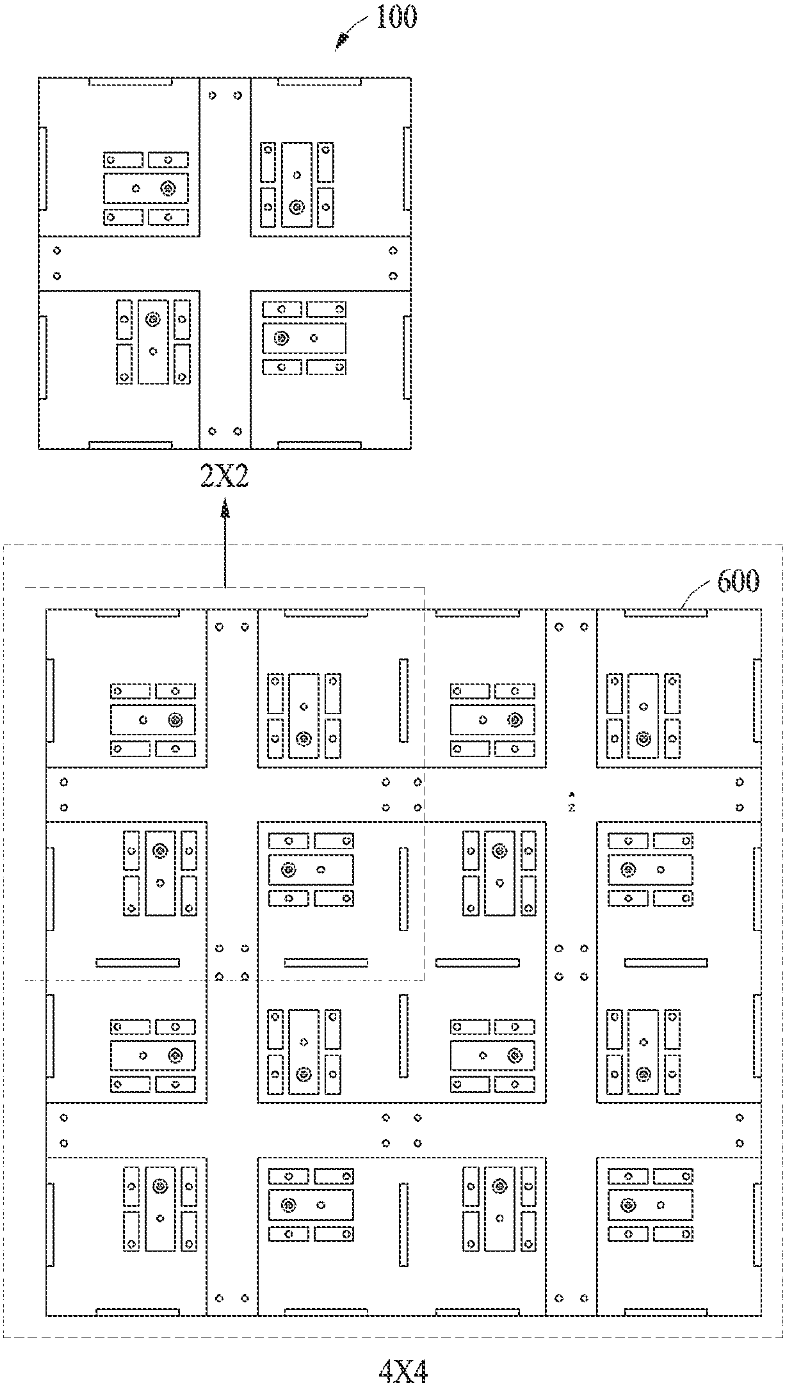
FIGS. 6A and 6B are diagrams illustrating an expansion of an antenna according to an embodiment.
Figure 6B:
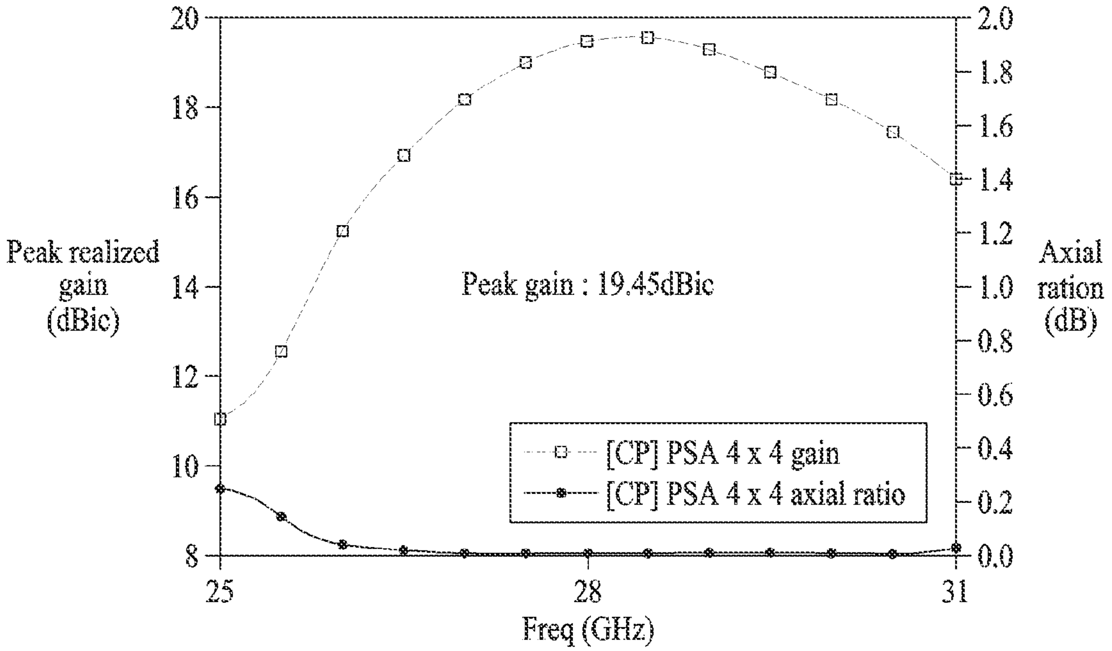

FIGS. 6A and 6B are diagrams illustrating an expansion of an antenna according to an embodiment.

Referring to FIG. 6A, the antenna 100 with a 2×2 structure and an antenna 600 with a 4×4 structure are shown.

The antenna 100 may be an antenna in which radiator units are arranged in a 2×2 array with respect to a cross-shaped conductor. One or more antennas may be connected and extended. Multiple identical antennas 100 may be connected and extended in the row and column directions. Accordingly, the radiator units may be extended to an antenna arranged in a $2^N \times 2^N$ (N=1, 2, 3, . . . ) array.

According to an embodiment, the extended antenna may be an antenna that electrically connects a plurality of antennas. In other words, a plurality of antennas formed on different substrates may be electrically connected to be extended.

According to an embodiment, the extended antenna may be formed on one substrate. The extended antenna may have a structure in which a single substrate with a flat structure is divided into a plurality of areas and the structure of the antenna 100 described above is formed in each area. Referring to FIG. 6A, the antenna 600 with a 4×4 structure is shown, in which one substrate is divided into four areas and the structure of the antenna 100 described above is formed in each area.

Referring to FIG. 6B, a graph 610 and a table 620 indicating performance of the antenna 600 are shown.

Hereinafter, the antenna 600 may be an antenna designed to generate LHCP. Here, the gain of the antenna 600 may be 19.45 dBic and may be improved compared to the gain of the antenna 100, which is 14.72 dBic. The gain variation of the antenna 600 may be 1.37 dB, which is less than the gain variation of the antenna 100.

Hereinafter, a method of manufacturing the antenna 100 described above is described.

Figure 7:
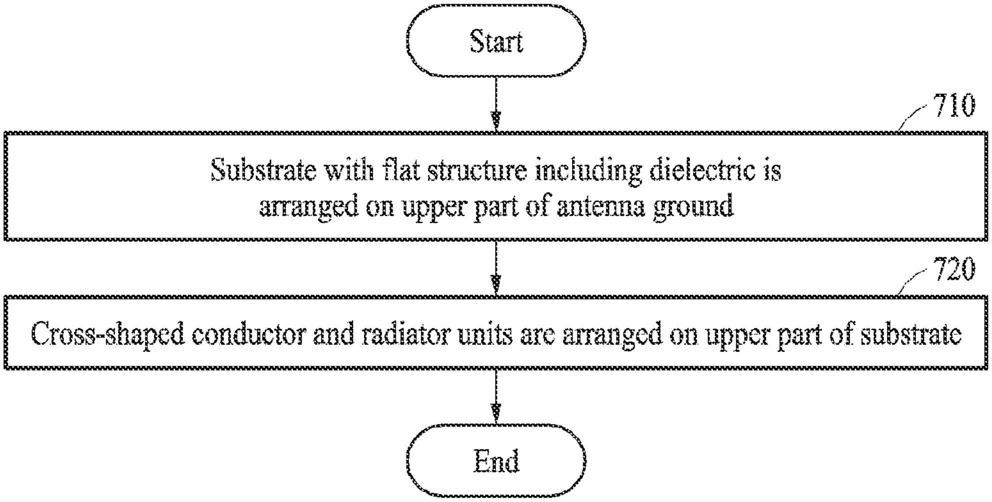
FIG. 7 is a flowchart illustrating a method of manufacturing an antenna, according to an embodiment.

FIG. 7 is a flowchart illustrating a method of manufacturing an antenna, according to an embodiment.

In operation 710, a substrate with a flat structure including a dielectric may be arranged on an upper part of an antenna ground.

In operation 720, a cross-shaped conductor and radiator units may be arranged on an upper part of the substrate.

The cross-shaped conductor may be arranged at the center of the upper part of the substrate. The radiator units may be arranged in each of four areas divided by the cross-shaped conductor. Each of the radiator units may be arranged to have 90-degree difference from an adjacent radiator unit with respect to the center of the substrate.

The method of manufacturing the antenna may further include forming shorting pins and/or feeding pins for the radiator units and the cross-shaped conductor. The radiator units may include a main radiator and a plurality of auxiliary radiators. A shorting pin and a feeding pin may be formed on the main radiator. Shorting pins may be formed on the plurality of auxiliary radiators. Shorting pins may be formed on the cross-shaped conductor.

The method of manufacturing the antenna may include connecting the feeding pins with a feed network and/or an RF circuit arranged on the lowest layer of the antenna. The method of manufacturing the antenna may include connecting the shorting pins to the antenna ground arranged on a lower part of the substrate.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed embodiments, can be made.

What is claimed is:

1. An antenna comprising:
a substrate with a flat structure comprising a dielectric;
a cross-shaped conductor arranged at a center of an upper part of the substrate; and
radiator units on the upper part of the substrate, arranged respectively in four divided areas formed by the cross-shaped conductor on the upper part of the substrate,
wherein
each of the radiator units is arranged to have a 90-degree difference from an adjacent radiator unit with respect to a center of the substrate, and
the cross-shaped conductor is configured to generate coupling when circular polarization occurs in the radiator units;
wherein
the cross-shaped conductor comprises a plurality of shorting pins arranged at a distance from a center of the cross-shaped conductor that is greater than a distance from the center of the cross-shaped conductor to the radiator units.

2. The antenna of claim 1, wherein
each of the radiator units comprises:
a main radiator comprising a feeding pin and a shorting pin; and
a plurality of auxiliary radiators comprising shorting pins.

3. The antenna of claim 2, wherein
the plurality of auxiliary radiators is arranged adjacent to the main radiator, and
lengths of the plurality of auxiliary radiators are shorter than a length of the main radiator.

4. The antenna of claim 2, wherein
the feeding pin of the main radiator is arranged closer to the cross-shaped conductor than the shorting pin of the main radiator is to the cross-shaped conductor.

5. The antenna of claim 1, further comprising:
a plurality of parasitic elements arranged on edges that are not in contact with the cross-shaped conductor, among edges of the four areas,
wherein the plurality of parasitic elements is arranged symmetrically with respect to the cross-shaped conductor.

6. The antenna of claim 2, further comprising:

an antenna ground arranged on a lower part of the substrate, wherein the plurality of shorting pins of the cross-shaped conductor, the shorting pin of the main radiator, and the shorting pins of the auxiliary radiators are connected to the antenna ground.

7. The antenna of claim 6, wherein the antenna ground comprises a cross-shaped slot arranged at a position corresponding to the center of the upper part of the substrate at which the cross-shaped conductor is arranged, wherein a size of the cross-shaped slot is smaller than a size of the cross-shaped conductor.

8. The antenna of claim 2, further comprising:

a feed network and/or a radio-frequency (RF) circuit arranged on a lowest layer of the antenna, wherein the feeding pin of the main radiator is connected to the feed network and/or the RF circuit.

9. An antenna comprising:

a substrate with a flat structure comprising a dielectric;

a cross-shaped conductor arranged at a center of an upper part of the substrate;

radiator units on the upper part of the substrate, arranged respectively in four divided areas formed by the cross-shaped conductor on the upper part of the substrate; and an antenna ground comprising a cross-shaped slot arranged on a lower part of the substrate, wherein each of the radiator units is arranged to have a 90-degree difference from an adjacent radiator unit with respect to a center of the substrate, and the cross-shaped conductor is configured to generate coupling when circular polarization occurs in the radiator units, and wherein the cross-shaped conductor comprises a plurality of shorting pins arranged at a distance from a center of the cross-shaped conductor that is greater than a distance from the center of the cross-shaped conductor to the radiator units.

10. The antenna of claim 9, wherein each of the radiator units comprises:

a main radiator comprising a feeding pin and a shorting pin; and a plurality of auxiliary radiators comprising shorting pins.

11. The antenna of claim 10, wherein the plurality of auxiliary radiators is arranged adjacent to the main radiator, and lengths of the plurality of auxiliary radiators are shorter than a length of the main radiator.

12. The antenna of claim 10, wherein the feeding pin of the main radiator is arranged closer to the cross-shaped conductor than the shorting pin of the main radiator is to the cross-shaped conductor.

13. The antenna of claim 9, further comprising:

a plurality of parasitic elements arranged on edges that are not in contact with the cross-shaped conductor, among edges of the four areas, wherein the plurality of parasitic elements is arranged symmetrically with respect to the cross-shaped conductor.

14. The antenna of claim 10, wherein the plurality of shorting pins of the cross-shaped conductor, the shorting pin of the main radiator, and the shorting pins of the auxiliary radiators are connected to the antenna ground.

15. The antenna of claim 9, wherein the cross-shaped slot is arranged at a position corresponding to the center of the upper part of the substrate at which the cross-shaped conductor is arranged, wherein a size of the cross-shaped slot is smaller than a size of the cross-shaped conductor.

16. The antenna of claim 10, further comprising:

a feed network and/or a radio-frequency (RF) circuit arranged on a lowest layer of the antenna, wherein the feeding pin of the main radiator is connected to the feed network and/or the RF circuit.

17. A method of manufacturing an antenna, the method comprising:

arranging a substrate with a flat structure comprising a dielectric on an upper part of an antenna ground;

arranging a cross-shaped conductor and radiator units on an upper part of the substrate;

forming shorting pins for the radiator units and the cross-shaped conductor; and arranging the shorting pins at a distance from a center of the cross-shaped conductor that is greater than a distance from the center of the cross-shaped conductor to the radiator units, wherein the cross-shaped conductor is arranged at a center of the upper part of the substrate, wherein the radiator units are arranged in each of four divided areas formed by the cross-shaped conductor on the upper part of the substrate, and wherein each of the radiator units is arranged to have a 90-degree difference from an adjacent radiator unit with respect to a center of the substrate, and the cross-shaped conductor is configured to generate coupling when circular polarization occurs in the radiator units.

18. The method of claim 17, wherein a main radiator comprised in the radiator units comprises a shorting pin and a feeding pin.

* * * * *